United States Patent [19]

Vrijssen

[11] Patent Number: 5,572,087
[45] Date of Patent: Nov. 5, 1996

[54] IMPROVED CATHODE RAY TUBE OF AN IMAGE INTENSIFIER TYPE IN WHICH INTERNAL PROTECTIVE FILMS ARE DEGRADED ORGANIC MATERIALS

[75] Inventor: Gerardus A. H. M. Vrijssen, Eindhoven, Netherlands

[73] Assignee: U.S. Philips Corporation, New York, N.Y.

[21] Appl. No.: 83,809

[22] Filed: Jun. 28, 1993

Related U.S. Application Data

[63] Continuation-in-part of Ser. No. 977,426, Feb. 23, 1993, abandoned.

[51] Int. Cl.$^6$ ........................................... H01J 31/00
[52] U.S. Cl. ............................................... 313/479
[58] Field of Search .................................. 313/479, 524

[56] References Cited

U.S. PATENT DOCUMENTS

| | | | |
|---|---|---|---|
| 2,545,120 | 2/1948 | Swedland | 315/3 |
| 4,030,948 | 6/1977 | Berger | 148/33.3 |
| 4,124,540 | 11/1978 | Foreman et al. | 252/518 |
| 4,153,857 | 5/1979 | Delsing et al. | 313/481 |
| 4,217,521 | 8/1980 | Dietch et al. | 313/479 |
| 4,220,893 | 9/1980 | Miller et al. | 313/450 |
| 4,255,689 | 3/1981 | Fischman | 315/3 |
| 4,342,943 | 8/1982 | Weaver | 313/479 |
| 4,418,171 | 11/1983 | Hall | 524/268 |
| 4,473,774 | 9/1984 | Hernqvist | 313/479 |
| 4,639,385 | 1/1987 | Jolitz et al. | 427/386 |
| 5,159,618 | 10/1992 | Blake | 378/139 |

Primary Examiner—Alvin E. Oberley
Assistant Examiner—Lawrence O. Richardson
Attorney, Agent, or Firm—Leroy Eason

[57] ABSTRACT

Electrically insulating surfaces of an image intensifier are covered with a film of an organic material. This improves the high-voltage behavior of the image intensifier. The image intensifier further has an anode hung by means of insulating rods, which rods are covered by the film.

3 Claims, 4 Drawing Sheets

IMPROVED CATHODE RAY TUBE OF AN IMAGE INTENSIFIER TYPE IN WHICH INTERNAL PROTECTIVE FILMS ARE DEGRADED ORGANIC MATERIALS

This is a continuation-in-part of U.S. patent application, Ser. No. 07/977,426, filed Feb. 23, 1993, and now abandoned, and the benefits of all common subject matter are hereby claimed for this application.

The invention relates to a cathode ray tube comprising an electron gun, in which an electrically insulating surface is covered with an electrically insulating film.

BACKGROUND OF THE INVENTION

Such a cathode ray tube is known from U.S. Pat. No. 4,473,774.

In operation, one or more electron beams are generated in cathode ray tubes. Cathode ray tubes are used in television receivers, electron microscopes, oscilloscopes, X-ray detectors, image intensifiers, photomultipliers, ion-implantation apparatuses and other devices. Within the framework of the invention the term electron gun is to be understood to mean a means of generating electrons. The electrons may be generated in the form of an electron beam.

A problem which occurs in cathode ray tubes is that, in operation, surfaces inside the cathode ray tube are charged. Such charging phenomena occur, in particular, on electrically insulating surfaces. As a result thereof, negative effects may occur. For example, flashover between components of the cathode ray tube ("arcing") and undesirable light effects ("blue glow") may occur. These effects are also referred to herein as the high-voltage behavior of the cathode ray tube. U.S. Pat. No. 4,473,774 discloses a cathode ray tube having an electron gun arranged in the neck. The inner side of the neck is covered with a film of a non-ionic organic copolymer. The cathode ray tube disclosed in U.S. Pat. No. 4,473,774 should comply with the following requirements:

1. The copolymer used does not degrade at the temperatures which are customary during the manufacture of a cathode ray tube, i.e. the film should be heat resistant.
2. Steps must be taken to prevent the film from becoming detached.
3. The applied film cannot withstand RF spot-knocking (RFSK), which is a frequently used method in the manufacture of cathode ray tubes.
4. Care must be taken that the film does not become overheated during manufacture of the cathode ray tube.

As a result of the above-mentioned drawbacks the cathode ray tube as described in U.S. Pat. No. 4,473,774 is not suited for mass production. Only very few materials are suitable and the manufacturing method should comply with very stringent requirements.

SUMMARY OF THE INVENTION

It is an object of the invention to provide a cathode ray tube of the type defined in the opening paragraph, which entirely or at least partly solves one or more of the above-mentioned problems.

In accordance with a first aspect of the invention a cathode ray tube of the type defined in the opening paragraph is characterized in that the film is a degradation product of a layer of an organic material, further characterized in that the cathode ray tube is an image intensifier tube, and in that the film is provided on an insulating surface within the envelope of the tube.

For this invention the image intensifier tube has an anode hung, or suspended, by means of insulating rods, where the rods are covered by the film.

In the context of the invention a degradation product is to be understood to mean a film which is a residue of a layer of an organic material which has been subjected to a treatment in which the originally deposited layer of organic material decomposes partly, leaving a residual film.

A residual film of a material which decomposes partly at the high temperatures and the conditions customary during the manufacture of a cathode ray tube is found to improve the high-voltage behavior in spite of the fact that the originally applied layer has partly decomposed.

The recognition of this fact makes it possible to employ materials which partly decompose when subjected to temperatures and conditions customary during manufacture. This class of materials includes, for example, nitrocellulose, polyacrylates, acrylic resins, polyvinyl compounds such as polyvinyl acrylates, polyvinyl acetates and polyvinyl alcohols, fats and organic soaps. All these materials are subjected to a partial thermal decomposition at temperatures as customary during manufacture of a cathode ray tube. Nevertheless, the residual films left after partial decomposition are found to be useful.

In general, steps to preclude overheating of the film, as described in U.S. Pat. No. 4,473,774, are therefore not necessary. Moreover, a partial decomposition of the film has a positive effect on the high-voltage behavior of the cathode ray tube.

Thus, fewer requirements are imposed on the materials used and on the temperature control, which renders the cathode ray tube better suited for mass production.

In accordance with a second aspect of the invention a cathode ray tube of the type defined in the opening paragraph is characterized in that the film is a film of an organic material and the thickness of the film is less than 1 micron.

Within the scope of the invention a film or organic material is to be understood to mean a film which consists at least predominantly of an organic compound or a mixture of organic compounds. Such a film will hereinafter also be referred to as "organic film".

If the thickness of the film is less than 1 micron the film generally adheres well to the insulating surface. Therefore, means and process steps to ensure that the layer adheres to the insulating surface may be dispensed with. This allows the method of applying the film to be simplified.

Moreover, a film thinner than 1 micron is found to be capable of withstanding spot-knocking. Therefore, it is not necessary to abandon a customary process step.

As a result, the cathode ray tube is better suited for mass production.

Preferably, the two above-mentioned aspects are combined.

Generally, the conductivity of the film changes during and as a result of the partial decomposition of the applied layer. The sheet resistance of the film decreases. This has also a negative effect on the adhesion of the film to the surface. As regards these aspects a film thinner than 1 micron may generally be subjected to a more extensive and longer decomposition than a layer thicker than 1 micron. This reduces the likelihood of rejects.

Preferably, the thickness of the film is between approximately 500 nm and approximately 10 nm.

If the film is thinner than 10 nm it is not unlikely that the underlying insulating surface is not entirely covered. This will give rise to high-voltage problems at the non-covered parts of the insulating surface.

Preferably, the coefficient of secondary electron emission, as a function of the kinetic energy of the electrons, exhibits a second crossover ($E_{II}$) for an energy lower than approximately 1 keV.

It has been found that in general the value of the second crossover ($E_{II}$) for the residual film is significantly smaller than the value of the second crossover of the originally deposited layer, which improves the high-voltage behavior. This is particularly favorable if the originally deposited layer is of a material having a second crossover value above 1 keV. Examples of materials having a second crossover above 1 keV are acrylic resins, organic soaps and polyvinyl acetates. For this aspect it is also favorable if the thickness of the film is smaller than 1 micron because this enables a more extensive decomposition and hence a substantial reduction of the second crossover ($E_{II}$) to be obtained.

For cathode ray tubes having an electron gun in a tube neck of an electrically insulating material a film is preferably provided at least on the inner side of the tube neck. The electric potential at the tube neck is then very stable. No or very little flashover and drift take place. Drift is an effect characterized by a slow change in the place and/or shape of an electron beam generated by the electron gun.

In particular when the film is applied to a curved surface, for example the inner side of the tube neck, it is advantageous if the thickness of the film is less than 1 micron. As a result of the curvature of the inner side of the tube neck the film tends to come off the surface comparatively easily if greater than 1 micron.

In the case of cathode ray tubes comprising an electron gun having elements of an electrically insulating material these elements are preferably covered with a film of an organic material.

Examples of such elements are the fixing elements such as the so-called multiform rods. Multiform rods are glass rods in which electrodes of a gun are secured. If the multiform rods have been covered with an organic film, flashover between the multiform rods and components of the electron gun and drift caused by charging the multiform rods hardly ever occur or do not occur at all.

For cathode ray tubes having electrodes constituting a main lens preferably at least one of these electrodes is subjected to an etching process.

Preferably, the above-mentioned film has a high carbon content.

A method of manufacturing a cathode ray tube is characterized in that in a process step an internal surface of an element of the cathode ray tube is moistened with a solution of an organic substance and is subsequently dried, the layer thus formed being decomposed at least partly.

In this manner the organic film can be applied simply. The thickness of the organic film can be readily controlled via the amount of organic substance in the solution. In the scope of the invention the term "internal surface of an element of the cathode ray tube" is to be understood to mean a surface of an element situated in the interior of the assembled cathode ray tube. Moistening and drying the surface can take place before the cathode ray tube is assembled, for example on separate elements.

Preferably, the layer is decomposed at least partly by subjecting it to a thermal treatment. This treatment can be carried out during drying or while the cathode ray tube is being annealed. Preferably, the thermal treatment is carried out in a vacuum.

Alternatively, an electron bombardment can be used to at least partly decompose the organic film. Decomposition of the film leads to an increase of the carbon content of the film relative to the other constituents of the film, which generally leads to a reduction of the value for the second crossover ($E_{II}$), which has a positive effect on the high-voltage behavior.

BRIEF DESCRIPTION OF THE DRAWING FIGURES

The invention will now be described in greater detail by means of an exemplary embodiment of the inventive display device and with reference to the accompanying drawings. In the drawings FIG. 1 is a longitudinal sectional view of a display device in accordance with the invention, FIG. 2 is a sectional view of a neck portion of a cathode ray tube in accordance with the invention, FIG. 3 shows, as a function of the kinetic energy of an incident electron $E_{kin}$, the coefficient of secondary electron emission ε for a nitrocellulose film (curve 31) after heating in a vacuum (curve 32) and after electron bombardment (curve 33);

The Figures are not drawn to scale. In general, corresponding parts bear the same reference numerals in the Figures.

DESCRIPTION OF THE INVENTION

Figure 1:
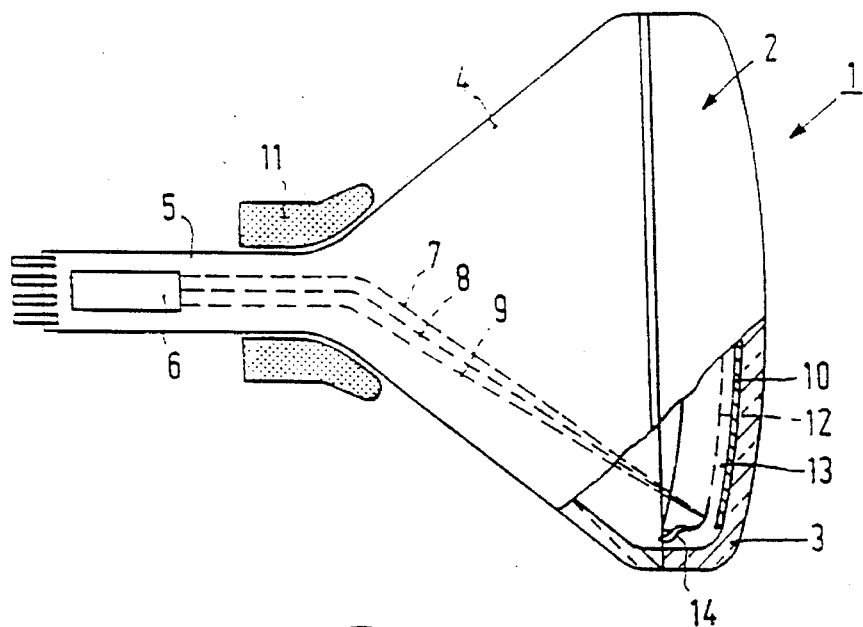

FIG. 1 is a longitudinal cross-sectional view of a display device according to the invention. The display device comprises a cathode ray tube, in this example a color display tube 1. This color display tube comprises an evacuated envelope 2 which consists of a display window 3, a cone portion 4 and a neck 5. In the neck 5 there is provided an electron gun 6 for generating three electron beams 7, 8 and 9 which extend in one plane, the in-line plane which in this case is the plane of the drawing. A display screen 10 is provided on the inside of the display window. The display screen 10 comprises a large number of phosphor elements luminescing in red, green and blue. On their way to the display screen 10, the electron beams 7, 8 and 9 are deflected across the display screen by means of deflection unit 11 and pass through a color selection electrode 12 which is arranged in front of the display window 3 and which comprises a thin plate with apertures 13. The color selection electrode is suspended in the display window by means of suspension means 14. The three electron beams 7, 8 and 9 pass through the apertures 13 of the color selection electrode at a small angle with each other, and consequently, each electron beam impinges on phosphor elements of only one color.

Figure 2:
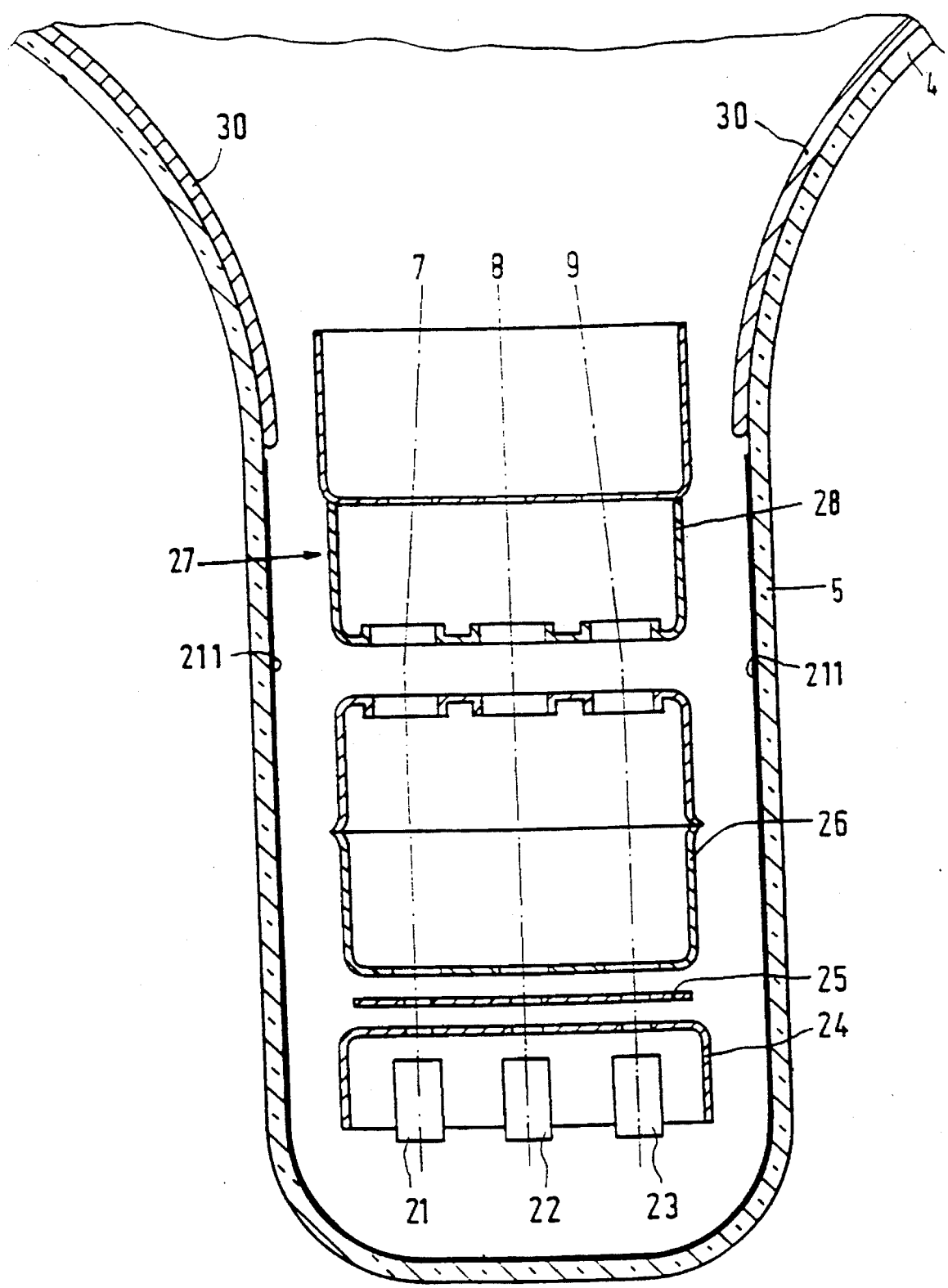

The electron gun is arranged in the neck portion (FIG. 2). In this example, the electron gun comprises cathodes 21, 22 and 23 and a number of electrodes 24, 25, 26 and 27, a main lens being formed between the electrodes 26 and portion 28 of electrode 27. A conductive layer 30 is provided on the cone portion 4. A film 211 of an organic material is applied to the inner side of the neck portion 5. It has been found that such a film substantially improves the high-voltage behavior of the cathode ray tube. In operation, a poor high-voltage behavior manifests itself through the undesired lighting up of the screen and/or breakdowns in the tube and/or through the appearance of one or more patches of a blue glimmer on the inner wall of the tube and/or along the multiform rods. The invention is based on the insight that these phenomena can probably also be attributed to electron transport along electrically insulating surfaces. Electrons "hopping" across the tube wall may cause the glimmers of light either by ionization of residual gas in the tube or by luminescence of the glass. Electrons hopping across electrically insulating surfaces are formed if the surfaces have a high coefficient of secondary emission. When electrons (for example, electrons formed by field emission) are incident on these surfaces, an ever increasing number of electrons will "hop" across the electrically insulating surfaces under the influence of an electric field toward the highest potential. These hopping electrons cause cold emission, charging of the neck and multiforms, and breakdowns in the tube. In addition, if the cathode ray tube comprises a display screen, the display screen may light up a little, which results in a reduction of the contrast. A further voltage increase leads to greater high-voltage problems. Flashover may damage the electron gun and it may adversely affect the operation of electronic circuits. The phenomena are substantially suppressed by the application of an organic film to insulating surfaces. The application of an organic film not only leads to a reduction of the above technical problems, but it also reduces the number of rejects because a substantial percentage of the rejects in the manufacture of cathode ray tubes may be attributed to high-voltage problems. Thus, one of the advantages of the present invention is that it allows higher voltages to be used. The light output can be increased by raising the kinetic energy of the electrons. This is important, in particular, for projection-cathode ray tubes, cathode ray tubes for HDTV applications, etc. Such tubes preferably have a very high light output. The present invention enables these advantages to be obtained.

In a test cathode ray tube the inner side of the neck and the multiform rods are moistened with a solution of nitrocellulose $(C_6H_7O_{11}N_3)^n$ in ethyl acetate or amyl acetate, for example a 1% solution of nitrocellulose in ethyl acetate. After drying, a layer of nitrocellulose remains. Subsequently, this layer is preferably heated in a vacuum, as a result of which the layer at least partly decomposes, causing the carbon content in the layer to increase relative to the other constituents (for example, oxygen or nitrogen) in the layer. For example, a temperature treatment in which the film is heated to approximately 350° C. in a vacuum for approximately 15 minutes reduces the molar percentage of oxygen present in the layer to approximately ⅓ to ⅕ of the molar percentage of oxygen present before the thermal treatment in a vacuum, and it reduces the percentage of nitrogen to approximately half the molar percentage of nitrogen present in the film before the thermal treatment in a vacuum. An analysis by means of XPS measurements and IR spectra further reveals that such a film is partly carbonized as a result of the partial thermal decomposition, i.e. carbon bound by four single bonds and carbon bound by two single bonds and a double bond is formed in the film. The film has been found to contain approximately (in atomic percentages) 50% (±5%) of C, approximately 15% (±3%) of O, approximately 30% (±3%) of H, and approximately 3% (±2%) of N.

A further advantage of a temperature treatment resides in the fact that the composition of the film does not change or changes very little in operation, whereas the composition of a film which is not subjected to a temperature treatment or other type of decomposition treatment (for example, electron bombardment and/or sputtering with argon gas, which treatments can also cause a partial decomposition of the layer) may change in operation. In general, the resistance of the film changes as a result of the decomposition. The resistance generally decreases. The thickness of the film is generally less than 1 micron. For a film having a thickness of approximately 20 nm, the sheet resistance, after partial decomposition, exhibits a comparatively large spread, depending on the degree of decomposition, and lies in the range between approximately $10^{14}$ and approximately $10^{11}$ $\Omega/\square$. The sheet resistance is approximately 50 times as small for layers having a thickness of more than 1 micron. If the sheet resistance is less than approximately $10^{10}$ $\Omega/\square$, the likelihood of high-voltage problems increases considerably. The likelihood of the sheet resistance being too low for a layer thicker than 1 micron is comparatively great.

Even at a very high voltage (higher than 40 kV to approximately 50 kV, for example) the test cathode ray tube exhibited no cold emission and no flashover. A comparable tube which was not provided with a film of an organic material exhibited the above problems at voltages of approximately 25 to 30 kV. The term "voltage" is to be understood to mean herein the electric potential difference between the cathode and the final electrode of the electron gun. The electrons emitted by the electron gun have a kinetic energy of x keV if the "voltage" is x kV.

Moistening can be carried out, for example, by spraying the solution onto the surfaces or by applying it with a brush or by immersing the relevant parts in the solution or by applying the solution to the inner side of the neck by means of a brush or rollers.

Figure 3:
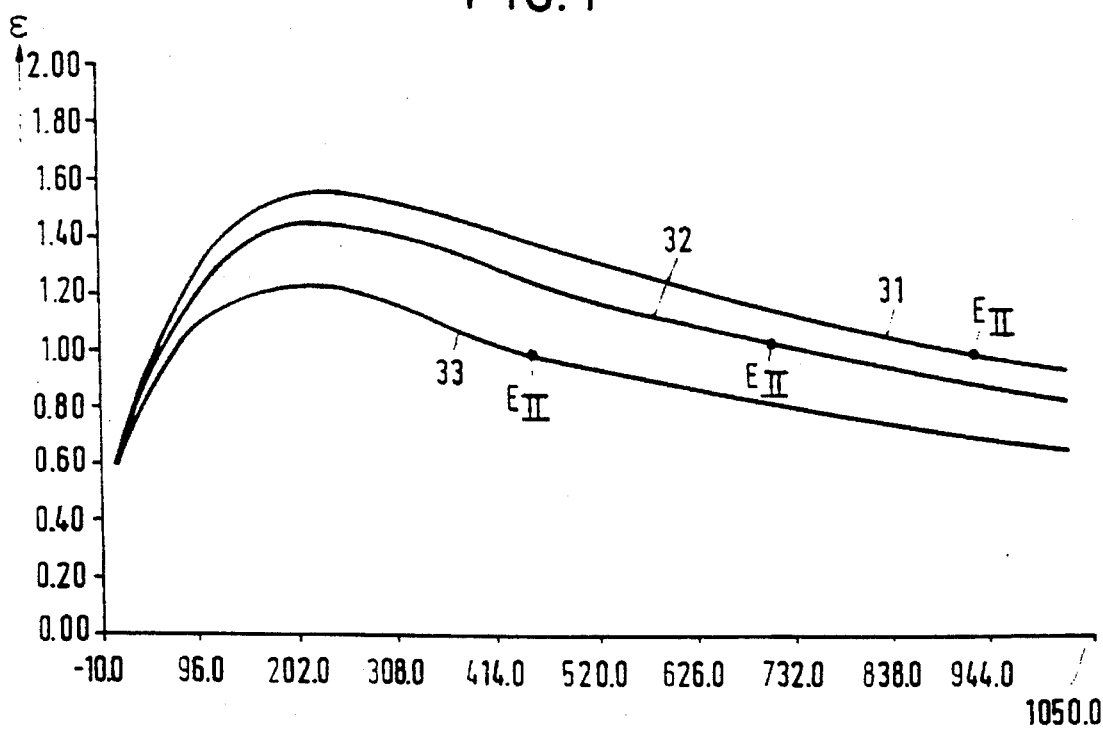

In the scope of the invention the coefficient of secondary electron emission of organic films on insulating surfaces has been examined. Methods of measuring coefficients of secondary electron emission have been described by V. E. Henrich in "Fast, Accurate Secondary-Electron Yield Measurements at Low Primary Energies", Review Scientific Instruments, Volume 44, page 456 (1973) and "Use of Cylindrical Auger Spectrometers for Retarding-Potential Secondary-Electron Yield Measurements", Review Scientific Instruments, Volume 45, page 861 (1974). FIG. 3 shows, as a function of the kinetic energy of an incident electron $E_{kin}$, the coefficient of secondary electron emission $\epsilon$ for a film of nitrocellulose (curve 31), after this film has been heated in a vacuum (curve 32) for approximately 30 minutes at a temperature of 380° C., and after electron bombardment (curve 33). This reveals that the coefficient of secondary electron emission changes both as a result of heating in a vacuum and as a result of electron bombardment. The coefficient of secondary emission exhibits a maximum of above 1 for these layers for a kinetic energy of approximately 200 eV. The film is so thin that the resistance is very high. The thickness of the film is preferably less than, for example, 1 μm and is in the range from 10 to 500 nm, for example. Such layers generally adhere well to the surface. A so-called pre-coating is not required. The films can withstand spot-knocking.

A possible explanation for the effect obtained by the film is that field emission electrons can be emitted when a strong electric field occurs between the film and a field emitter which may be, for example, a sharp point on a part of the electron gun. These electrons have an average kinetic energy. The average kinetic energy of field emission electrons impinging on the film is approximately equal to the potential difference between the field emitter and the film. When the average kinetic energy is larger than the energy $E_{II}$, which energy $E_{II}$ is given by the energy value above which the coefficient of secondary emission is smaller than 1, the bulk of the electrons is captured in the film and electron-hopping cannot take place. This energy $E_{II}$ is also termed "second crossover" (see, for example, "Handbook of Chemistry and Physics", 56th edition, CRC Press, p. E-366). The energy $E_{II}$ for curves 31, 32 and 33 is less than 1 keV, i.e. approximately 900 eV, approximately 730 eV and approximately 420 eV, respectively. Partial decomposition of the film reduces the value of the second crossover ($E_{II}$). An avalanche, or hopping effect, in which an electron, after having been accelerated by an electric field, liberates more than one electron, each of which in turn liberate more than one electron, etc., so that an ever increasing number of electrons move toward the highest potential, is then almost impossible. Electrons whose kinetic energy is less than $E_{II}$ may give rise to an avalanche effect. In general, potential differences smaller than approximately 1 kV are insufficient to bring about field emission because the electric field strengths necessary for field emission are not attained. Consequently, the above negative effects are substantially reduced by the application of a film, for example, a film of organic material, to insulating surfaces, which film exhibits a second crossover for an energy level smaller than 1 keV. It is assumed that, in general, such an avalanche effect does occur on a glass surface and contributes greatly to the above problems. In the case of glass, $E_{II}$ is generally of the order of a few kV. At potential differences of a few kV field emission can take place.

It follows from the above that partial decomposition of the film, for example, by heating or by an electron bombardment has a positive effect. $E_{II}$ generally decreases and this mitigates high-voltage problems. Organic films made of, for example, materials whose second crossover immediately after application is above 1 keV (examples are polyvinyl acrylate and acrylic resins for which $E_{II}$ is approximately 2–2.5 keV) exhibit a distinctly improved high-voltage behavior if they have been exposed to a high temperature (for example, approximately 350° C.–400° C. for approximately 10–30 minutes) or to an electron bombardment. It is advantageous where the film is subjected to a partial decomposition treatment if the thickness of the layer is not more than 1 micron, and preferably, not more than 500 nm. As a matter of fact, apart from a positive effect (reduction of $E_{II}$), decomposition also has a side-effect: the resistance of the layer decreases. If the sheet resistance becomes smaller than approximately $10^{10}$ Ω/□, the conduction via the film becomes such that the likelihood of high-voltage problems and, as a consequence, rejects increases. The likelihood of the resistance decreasing to such values during the decomposition process is comparatively great for layer thicknesses of more than 1 micron.

Preferably, films of organic polymers or derived therefrom are used. Information about polymers, their properties and processing methods are described in McGraw-Hill Encyclopedia of Science and Technology (1960) under "polymer" and related references. In general, polymers form a substantially smooth film of substantially uniform thickness on the surface. Preferably, the film is transparent. In this case, the electron gun can be inspected visually. Partly decomposed films generally have a grey or brown color depending on the degree of decomposition but are preferably transparent. A particularly advantageous class of polymers are the water-soluble polymers, for example polyvinyl alcohols. Water is harmless to the environment.

Figure 4A:
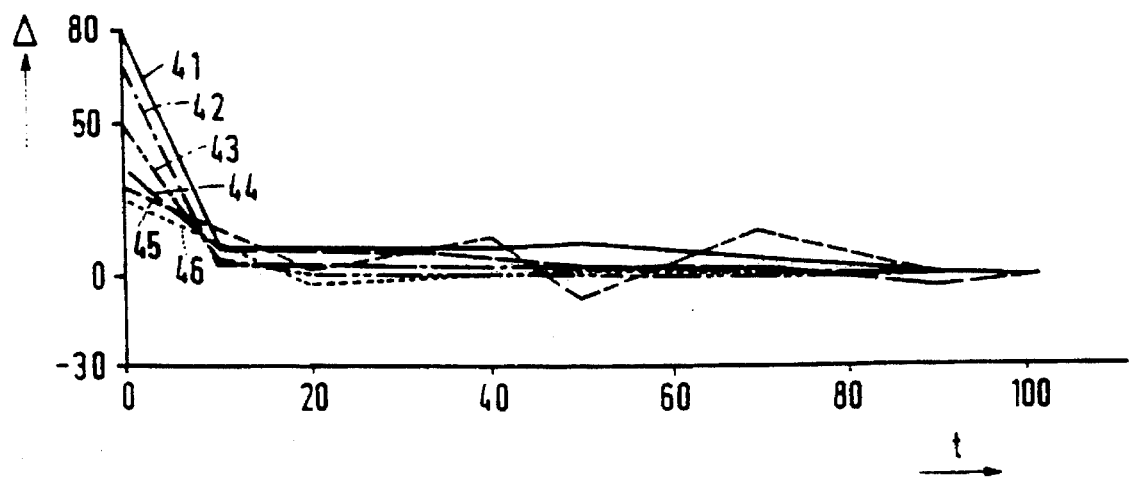
FIGS. 4a and 4b illustrate a further positive effect of an organic film.
Figure 4B:
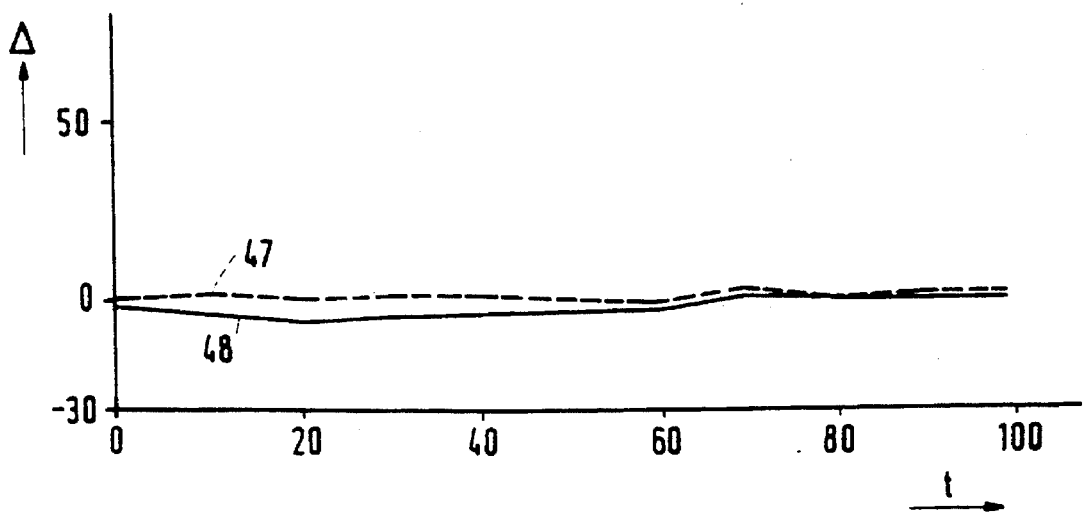

FIGS. 4a and 4b show a further positive effect of an organic film provided on the inside of the neck. A problem which occurs in color cathode ray tubes emitting more than one electron beam is the so-called convergence drift. After energizing the cathode ray tube, the relative positions of the electron beams on the display screen change. In FIGS. 4a and 4b the displacement Δ of the outermost electron beams relative to the central electron beam of a 14 inch in-line color cathode ray tube is plotted in micrometers (μ) as a function of time (t) in minutes. The time-dependent displacement of the relative positions of the electron beams will, for simplicity, hereinafter be referred to as "displacement". The displacement shown in curves 41 through 48 is related to the displacement after 100 minutes, which latter displacement is assumed to be 0 μ. Curves 41 through 46 show the displacement if no organic film is applied. The displacement is approximately 60 μ. Curves 47 and 48 show the displacement for a cathode ray tube in which the inside of the neck, more particularly, the portion of the neck facing the main lens, and the multiform rod are coated with an organic layer, in this case a residue of a nitrocellulose layer. The average displacement is approximately 4 μ, which is a considerable and important improvement. This reduction in displacement enables a better preservation of the convergence of the electron beams on the screen. The displacement shown relates to a cathode ray tube having a so-called in-line electron gun. The invention can also be applied to cathode ray tubes having other types of electron guns for emitting more than one electron beam, for example, so-called delta electron guns which, in operation, emit three electron beams located at the vertices of a triangle.

The invention is very important for cathode ray tubes, in particular, comprising an electron gun having a unipotential lens system. A unipotential lens system is a system for generating electric fields for focusing one or more electron beams with the electric potential, viewed in the direction of propagation of the electron beam(s), varying from a high initial value via a low intermediate value to a high final value. In such electron guns, the above problems occur at a relatively low maximum voltage because, in operation, relatively high electric potentials and large potential differences occur in different places of the electron gun.

For an electron gun having a main lens, at least one, and preferably both, lens electrodes of the main lens (the electrodes 26 and 27 in FIG. 2) are suitably formed by etching. Etching of the lens electrodes in conjunction with the film in accordance with the invention is found to have a highly positive effect on the high-voltage behavior, and in particular the maximum voltage attainable before flashover occurs is found to have increased significantly.

Further, the invention is important for cathode ray tubes, in particular, comprising one or more electron guns having a conductive coating. Examples of such electron guns are so-called spiral-lens electron guns. Such electron guns comprise an element which is made from an electrically insulating material, for example, a tubular element having a spiral-shaped coating of a conductive material provided on the inside, for example. By applying a potential across the conductive layer, a focusing and/or accelerating electric field for focusing and/or accelerating an electron beam is created in the element. Cathode ray tubes comprising such electron guns are very sensitive to flashover which may damage the conductive layer, which in turn leads to damage to the lens. In such a cathode ray tube according to the invention, the neck and/or the outside of the element are coated with an organic film. Further examples of electron guns having a conductive layer are electron guns having a voltage divider composed of a conductive strip which is applied to a plate of insulating material. In operation, an electric voltage is applied across the conductive strip.

Further, the invention is important to optoelectronic cathode ray tubes such as, for example, image intensifiers and photomultipliers. An important factor in such cathode ray tubes is the so-called dark-count. The dark-count is the signal generated by the cathode ray tube in absolute darkness during operation. The above-described glimmers of light caused by electron transfer across surfaces are undesired because they increase the dark-count. Light signals producing a weaker signal than the dark-count in the optoelectronic cathode ray tube can not be, or hardly be, measured. Thus, the dark-count is a measure of the optoelectronic sensitivity of such a tube.

Figure 5:
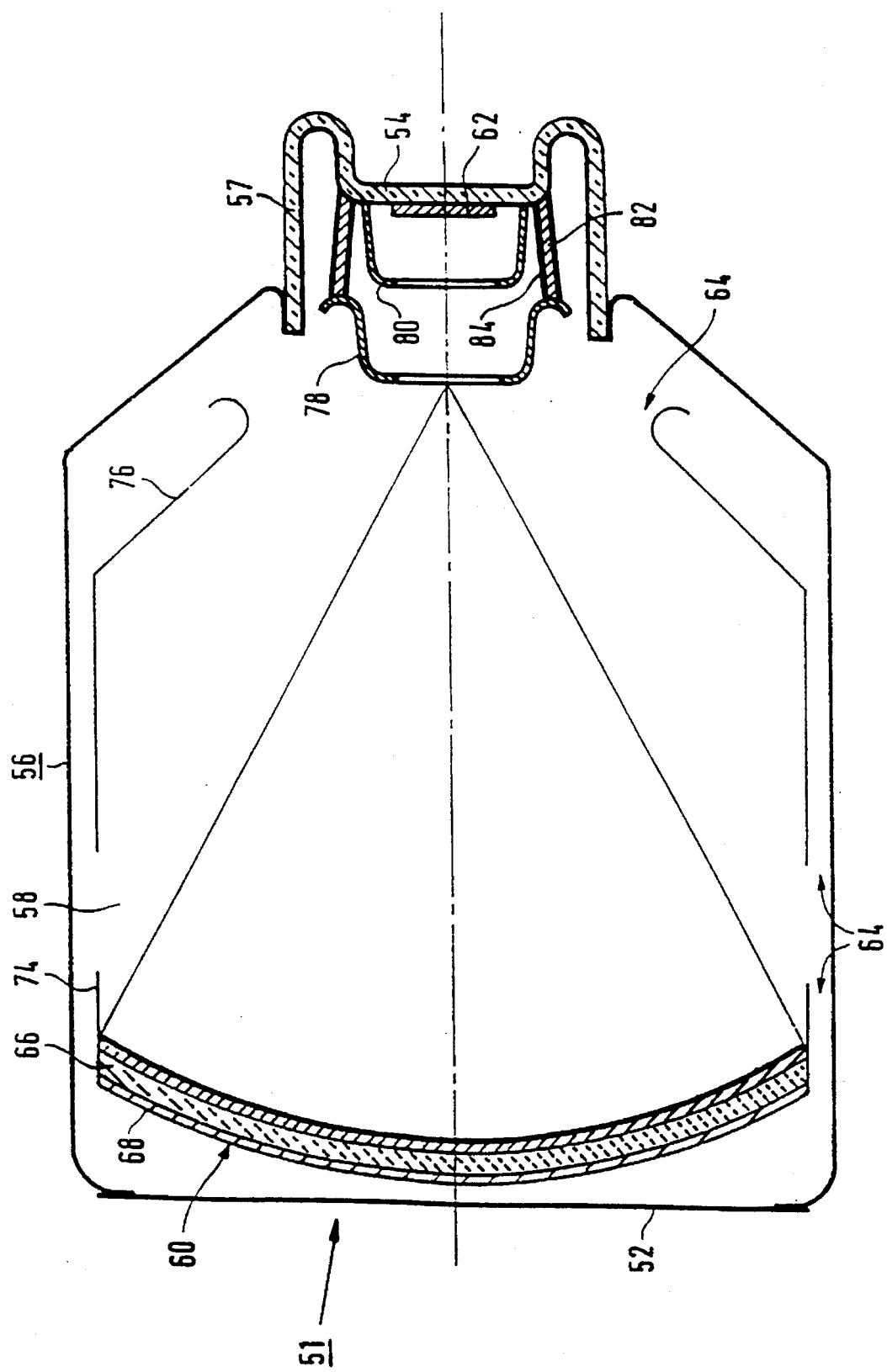
FIG. 5 is a sectional view of an image intensifier type tube according to the present invention.

FIG. 5 shows, for example, a type of image intensifier tube, such as in this case an X-ray image intensifier tube 51. Such image intensifier tubes comprise an entrance window 52, an exit window 54, a cylindrical envelope 56 and an insulating ring 57 which together enclose an evacuated space 58. In this space there are arranged an entrance screen 60, an exit screen 62 and an electron optical imaging system 64. The entrance screen of the tube forms a separate foil, for example, of titanium. In this case the entrance screen comprises a concave support 66. On the support there is provided a layer of luminescent material 68 on which there is provided a photocathode 72. The photocathode is a means for generating electrons. The entrance screen constitutes, for example in conjunction with a shielding ring 74, a first electrode of the electron-optical system 64 for imaging the electrons generated by the photocathode on the exit screen 62. The electron-optical system 64 also comprises a focusing electrode 76, a first anode 78, and an output anode 80. The insulating ring 57 is in this example made of glass. The first anode 78 is hung by means of insulating support glass rods 82. An insulating surface within the envelope, for example, on the glass support rods 82, or on the inside surface of the insulating ring 57, is covered by a film 84 as described above. The anodes 78 and 80 are usually at a high voltage. The film reduces high-voltages problems such as arcing. Upon application of such a film to the glass supports 82, not only do high-voltage problems decrease but also the sensitivity of the device increases.

It will be obvious that within the scope of the invention many variations are possible to those skilled in the art.

I claim:

1. A cathode ray tube of an image intensifier type comprising an electron gun, an electrically insulating surface in said cathode ray tube being covered with an electrically insulating film, characterized in that the film is a degradation product of a layer of an organic material, the film being provided on an insulating surface within an envelope of the image intensifier tube, and the organic material is an element selected from the group including nitride cellulose, polyacylalates, acrylic resins, polyvinyl compounds including polyvinyl acylates, polyvinyl acetates, and polyvinyl alcohols, fats and organic soaps.

2. A cathode ray tube of an image intensifier type comprising an electron gun, an electrically insulating surface in said cathode ray tube being covered with an electrically insulating type film, characterized in that the film is a degradation product of a layer of an organic material, the film being provided on an insulating surface within an envelope of the image intensifier tube, and the organic material is water soluble.

3. A cathode ray tube of an image intensifier type comprising an electron gun, an electrically insulating surface in said cathode ray tube being covered with an electrically insulating type film, characterized in that the film is provided on an insulating surface within an envelope of the image intensifier tube, the film is a partly carbonized layer of an organic material, and the film contains approximately (in atomic percentages) 50% ($\pm$5%) of C, approximately 15% ($\pm$3%) of O, approximately 30% ($\pm$3%) of H, and approximately 3% ($\pm$2%) of N.

* * * * *